A. E. L. SCANES.
GAGE.
APPLICATION FILED JULY 14, 1915.
1,268,497.
Patented June 4, 1918.
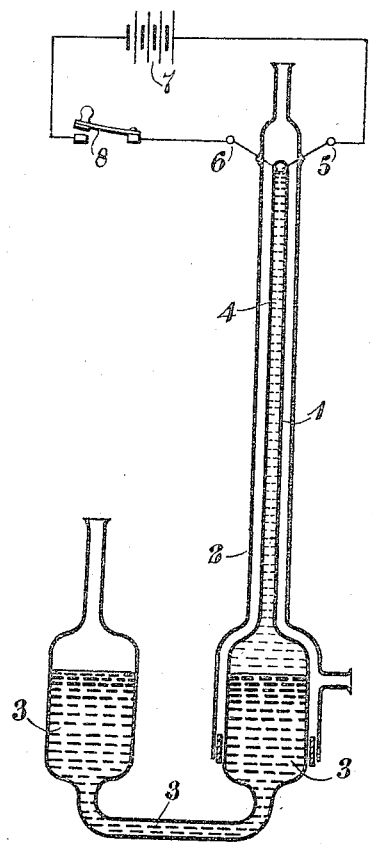
WITNESSES:
INVENTOR:
BY Arthur Edwin Leigh Scanes
HIS ATTORNEY IN FACT:

UNITED STATES PATENT OFFICE.

ARTHUR EDWIN LEIGH SCANES, OF ASHTON-ON-MERSEY, ENGLAND.

GAGE.

1,268,497. Specification of Letters Patent. Patented June 4, 1918.

Application filed July 14, 1915. Serial No. 39,784.

*To all whom it may concern:*

Be it known that I, ARTHUR EDWIN LEIGH SCANES, a subject of the King of Great Britain, and a resident of Ashton-on-Mersey, England, have invented a new and useful Improvement in Gages, of which the following is a specification.

This invention relates to measuring gages and more particularly to gages adapted to indicate directly the efficiency of a steam condenser. A gage of this type, to which the present invention is particularly applicable, comprises a U-tube or its equivalent, one leg of which is sealed and exhausted of air and contains water, the other leg of the U-tube being connected with a receptacle the pressure in which is to be measured. A gage of this character is described in application, Serial No. 804,915, filed by me on the 5th December, 1913.

In gages of this nature it is occasionally found that the water above the mercury in the sealed leg of the tube will not descend the tube. In order to obviate such an occurrence and render the gage available for use at all times I provide the interior of the gage tube according to the present invention with two electrodes of metal, platinum for example, one of which electrodes at least is sealed into the upper part of said tube. If now the aforesaid electrodes are connected with a suitable source of current, such for instance as one or more dry cells, some of the water in the tube will be resolved into its constituent gases which will cause the column of water in the tube to descend. To enable this to be readily accomplished the sealed-in electrodes are connected by suitable conductors with terminals supported on the gage itself or on its stand or case.

If desired one or more cells may be permanently connected in circuit and a switch provided so that the arrangement may be readily used as and when desired.

It will generally be found that a momentary application of current only will be sufficient because the formation of a minute bubble of gas will start the column of water into movement. The trace of gas thus formed will not affect the reading to a visible extent owing to the great ratio of expansion when the water descends the tube.

An example of how the invention may be carried out in practice is shown diagrammatically in the accompanying drawing which represents a gage for measuring the efficiency of a steam condenser of the kind described in my application, Serial No. 804,915 filed 5th December 1913. The sealed leg of the U tube of the gage is indicated at 1 and is surrounded by a jacket 2. A body of mercury 3 fills the lower part of the U tube above which in the sealed leg 1 is a quantity of water 4. Two platinum electrodes 5, 6 are sealed into the upper part of the sealed leg as shown. A suitable source of current, a couple of dry cells 7 for example, and a switch 8, are respectively connected with the electrodes 5, 6.

The invention is not limited to the constructional details shown in the accompanying drawing, as modifications may be made therein without departing from the spirit and scope thereof. For example, one of the electrodes 5 or 6 may be constituted by the mercury 3 in the U tube, if suitable means are provided for leading current thereinto.

I claim as my invention:

1. In a gage for indicating the efficiency of a steam condenser, the combination of a tube having one end closed and exhausted of air and containing water and the other end open and adapted to be connected with the vacuum space of the condenser, a mercury column separating the water in the sealed end of said tube from the open end thereof, means for maintaining the water in the sealed end of the tube at a temperature determined by the condenser, and means for passing an electric current through the water in the closed end of said tube.

2. An indicating gage comprising a U-shaped tube having one end closed and exhausted of air and containing water and the other end open and adapted to be connected with a receptacle the pressure in which is to be indicated, and means for passing an electric current through the water in the closed end of said tube.

3. An indicating gage comprising a U-shaped tube having one end closed and exhausted of air and containing water and the other end open and adapted to be connected with a receptacle the pressure in which is to be indicated, a column of mercury separating the water in the closed end of the tube from the open end thereof, and means for passing an electric current through the water in the closed end of said tube.

4. An indicating gage, comprising a U-shaped tube having one end closed and exhausted of air and containing an electrolytic liquid, and the other end open and adapted to be connected with a receptacle, the pressure in which is to be indicated, and means for occasioning electrolysis in the electrolytic liquid.

In testimony whereof I have hereunto subscribed my name this twenty-fifth day of June, 1915.

ARTHUR EDWIN LEIGH SCANES.

Witnesses:
W. D. BOWMAN,
JAS. STEWART BROADFOOT.

Copies of this patent may be obtained for five cents each, by addressing the "Commissioner of Patents, Washington, D. C."